(12) United States Patent
Hamrock et al.

(10) Patent No.: US 7,517,604 B2
(45) Date of Patent: Apr. 14, 2009

(54) FUEL CELL ELECTROLYTE MEMBRANE WITH ACIDIC POLYMER

(75) Inventors: Steven J. Hamrock, Stillwater, MN (US); James M. Larson, Saint Paul, MN (US); Phat T. Pham, Little Canada, MN (US); Matthew H. Frey, Cottage Grove, MN (US); Gregory M. Haugen, Edina, MN (US); William M. Lamanna, Stillwater, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 477 days.

(21) Appl. No.: 11/230,090

(22) Filed: Sep. 19, 2005

(65) Prior Publication Data

US 2007/0243446 A1    Oct. 18, 2007

(51) Int. Cl.
*H01M 8/10* (2006.01)
(52) U.S. Cl. .............................. 429/33; 429/12; 429/30; 429/42; 429/309; 521/27
(58) Field of Classification Search .................. 429/33, 429/12, 30, 42, 309; 521/27
See application file for complete search history.

(56) References Cited

U.S. PATENT DOCUMENTS

| 4,610,938 | A | 9/1986 | Appleby |
| 5,002,700 | A | 3/1991 | Otagawa et al. |
| 5,525,436 | A | 6/1996 | Savinell et al. |
| 5,981,097 | A | * | 11/1999 | Rajendran ..................... 429/33 |
| 6,059,943 | A | * | 5/2000 | Murphy et al. ............... 204/296 |
| 6,099,988 | A | | 8/2000 | Savinell et al. |
| 6,099,998 | A | | 8/2000 | Shibata et al. |
| 6,136,412 | A | | 10/2000 | Spiewak et al. |
| 6,248,469 | B1 | | 6/2001 | Formato et al. |
| 6,335,112 | B1 | | 1/2002 | Asukabe et al. |
| 6,447,943 | B1 | | 9/2002 | Peled et al. |
| 6,492,047 | B1 | | 12/2002 | Peled et al. |
| 6,495,209 | B1 | * | 12/2002 | Cisar .......................... 427/384 |
| 6,624,328 | B1 | | 9/2003 | Guerra |
| 6,716,548 | B1 | | 4/2004 | Kaliaguine et al. |
| 6,811,911 | B1 | | 11/2004 | Peled et al. |
| 7,358,288 | B2 | * | 4/2008 | Kerres ......................... 524/167 |
| 2002/0093008 | A1 | | 7/2002 | Kerres et al. |

(Continued)

FOREIGN PATENT DOCUMENTS

CA      2498370 A1    4/2004

(Continued)

OTHER PUBLICATIONS

J. A. Asensio, S. Borros, P. Gomez-Romero, "Enhanced Conductivity In Polyanion-Containing Polybenzimidazoles. Improved Materials For Proton-Exchange Membranes And PEM Fuel Cells", Electrochemistry Communications, 5(2003), pp. 967-972.

(Continued)

*Primary Examiner*—Peter D. Mulcahy
*Assistant Examiner*—Henry Hu
(74) *Attorney, Agent, or Firm*—Philip Y. Dahl

(57) ABSTRACT

An electrolyte membrane is formed by an acidic polymer and a low-volatility acid that is fluorinated, substantially free of basic groups, and is either oligomeric or non-polymeric.

18 Claims, 2 Drawing Sheets

U.S. PATENT DOCUMENTS

| | | | |
|---|---|---|---|
| 2003/0008196 | A1 | 1/2003 | Wessel et al. |
| 2004/0043283 | A1 | 3/2004 | Cipollini et al. |
| 2004/0096734 | A1 | 5/2004 | Calundann et al. |
| 2004/0099527 | A1 | 5/2004 | Nakayama |
| 2004/0107869 | A1 | 6/2004 | Velamakanni et al. |
| 2004/0118773 | A1 | 6/2004 | Uensal et al. |
| 2004/0121210 | A1 | 6/2004 | Hamrock et al. |
| 2005/0031925 | A1 | 2/2005 | Ofer et al. |
| 2005/0170252 | A1 | 8/2005 | Aihara |
| 2007/0065699 | A1 | 3/2007 | Larson et al. |

FOREIGN PATENT DOCUMENTS

| | | |
|---|---|---|
| CA | 2500784 A1 | 4/2004 |
| DE | 103 47 457 A1 | 4/2004 |
| EP | 1 339 072 A1 | 8/2003 |
| JP | 08-171923 | 7/1996 |
| JP | 2001-240742 | 9/2001 |
| JP | 2002-105129 | 4/2002 |
| JP | 2003-022824 | 1/2003 |
| WO | WO 99/44425 | 9/1999 |
| WO | WO 00/44816 | 8/2000 |
| WO | WO 01/54216 A2 | 7/2001 |
| WO | WO 02/05370 A1 | 1/2002 |
| WO | WO 2005/003081 A2 | 1/2005 |

OTHER PUBLICATIONS

Alberti et al., "Composite Membranes For Medium-Temperature PEM Fuel Cells", Annu. Rev. Mater. Res, 2003, 33: 129-154.

P.N. Ross, Jr., "Evaluation of Tetrafluoroethane-1,2-Disulfonic Acid as a Fuel Cell Electrolyte", *J. Electrochem. Soc.*, vol. 130, No. 4, Apr. 1983 pp. 882-885.

K.A. Striebel, et al., "Oxygen Reduction in Tetrafluoroethane-1,2-Disulfonic Acid", *Polypyrrole Film Electrodes*, vol. 132, No. 10, Oct. 1985, pp. 2381-2384.

M. Razaq et al., "Perfluorosulfonimide as an Additive in Phosphoric Acid Fuel Cell", *J. Electrochem. Soc.*, vol. 136, No. 2, Feb. 1989, pp. 385-390.

A.J. Appleby et al., "Novel Solid State Proton-Conductors Based on Polymeric Non-Oxy Acids", *Energy Fossil*, Jan. 1992, pp. 1-9.

Saffarian et al., Electrochemical Properties of Perfluoroalkane Disulfonic [HSOa(CF2)nSOaH] Acids Relevant to Fuel Cell Technology, J. *Electrochem. Soc.*, vol. 139, No. 9, Sep. 1992, pp. 2391-2397.

S.G. Prakash, "Stable, Electroinactive Wetting Agent for Fuel Cells", NASA Tech Briefs, Dec. 1994.

Sanjiv Malhotra and Ravindra Datta, "Membrane-Supported Non-volatile Acidic Electrolytes Allow Higher Temperature Operation of Proton-Exchange Membrane Fuel Cells", *J. Electrochem. Soc.*, vol. 144, No. 2, Feb. 1997, pp. L23-L26.

Stefan V. Kotov, et al., "Preparation of Perfluorocarbon Polymers Containing Phosphonic Acid Groups", *Journal of Florine Chemistry*, 82 (1997), pp. 13-19.

M. Bhamidipati, et al., "Novel Proton Exchange Membrane for High Temperature Fuel Cells", *Mat. Res. Soc. Symp. Proc.*, vol. 496, 1998 Materials Research Society, pp. 217-222.

Mecerreyes, et al., "Porous Polybenzimidazole Membranes Doped with Phosphoric Acid: Highly Proton-Conducting Solid Electrolytes", *Chem. Mater*: 2004, 16, pp. 604-607.

D.L. Maricle et al., "The GRI Electrolyte Program Tertrafluoroethylene-1,2-Bis-Phosphonic Acid", International Fuel Cells, HP258 (published prior to Sep. 25, 1991), pp. 1-4.

U.S. Appl. No. 11/079,832, filed Mar. 14, 2005, "Light Management Films with Zirconia Particles", now pending.

Application No. PCT/US2005/21351, filed Jun. 16, 2005, "Optical Film, Assembly and Display Device", now pending.

* cited by examiner

FUEL CELL ELECTROLYTE MEMBRANE WITH ACIDIC POLYMER

This invention was made with U.S. Government support under Cooperative Agreement DE-FC36-02AL67621 awarded by the Department of Energy. The U.S. Government has certain rights in this invention.

FIELD OF THE INVENTION

The present invention relates to electrolyte membranes in electrochemical devices, such as fuel cells. In particular, the present invention relates to electrolyte membranes that preserve proton conductivity and are stable when operated at high temperatures.

BACKGROUND OF THE INVENTION

Fuel cells are electrochemical devices that produce usable electricity by the catalyzed combination of a fuel such as hydrogen and an oxidant such as oxygen. In contrast to conventional power plants, such as internal combustion generators, fuel cells do not utilize combustion. As such, fuel cells produce little hazardous effluent. Fuel cells convert hydrogen fuel and oxygen directly into electricity, and can be operated at higher efficiencies compared to internal combustion generators.

A fuel cell such as a proton exchange membrane (PEM) fuel cell typically contains a membrane electrode assembly (MEA), formed by a catalyst coated membrane disposed between a pair of gas diffusion layers. The catalyst coated membrane itself typically includes an electrolyte membrane disposed between a pair of catalyst layers. The respective sides of the electrolyte membrane are referred to as an anode portion and a cathode portion. In a typical PEM fuel cell, hydrogen fuel is introduced into the anode portion, where the hydrogen reacts and separates into protons and electrons. The electrolyte membrane transports the protons to the cathode portion, while allowing a current of electrons to flow through an external circuit to the cathode portion to provide power. Oxygen is introduced into the cathode portion and reacts with the protons and electrons to form water and heat. The MEA also desirably retains water to preserve proton conductivity between the layers, particularly at the electrolyte membrane. A reduction in proton conductivity between the layers correspondingly reduces the electrical output of the fuel cell.

A common problem with fuel cells involves carbon monoxide poisoning of the catalyst layers, which reduces the effectiveness of the catalyst layers. To counter the reduction, higher catalyst concentrations are required to provide effective levels of electrical output. This correspondingly increases the material costs for manufacturing fuel cells. One technique for reducing the carbon monoxide poisoning includes operating the fuel cell at higher temperatures (e.g., above 100° C.). However, the elevated temperatures cause the water retained in the MEA to evaporate, thereby reducing the proton conductivity within and between the layers. As such, there is a need for an electrochemical device that preserves proton conductivity while operating at high temperatures.

BRIEF SUMMARY OF THE INVENTION

The present invention relates to an electrolyte membrane that includes an acidic polymer and an acid, where the acid is a low-volatility acid that is fluorinated, substantially free of basic groups, and is either oligomeric or non-polymeric. As a result, the electrolyte membrane may be used at high operating temperatures while preserving proton conductivity. The present invention further relates to a method of forming the electrolyte membrane and to an electrochemical device that includes the electrolyte membrane.

While the above-identified drawing figures set forth several embodiments of the invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale. Like reference numbers have been used throughout the figures to denote like parts.

DETAILED DESCRIPTION

Figure 1:
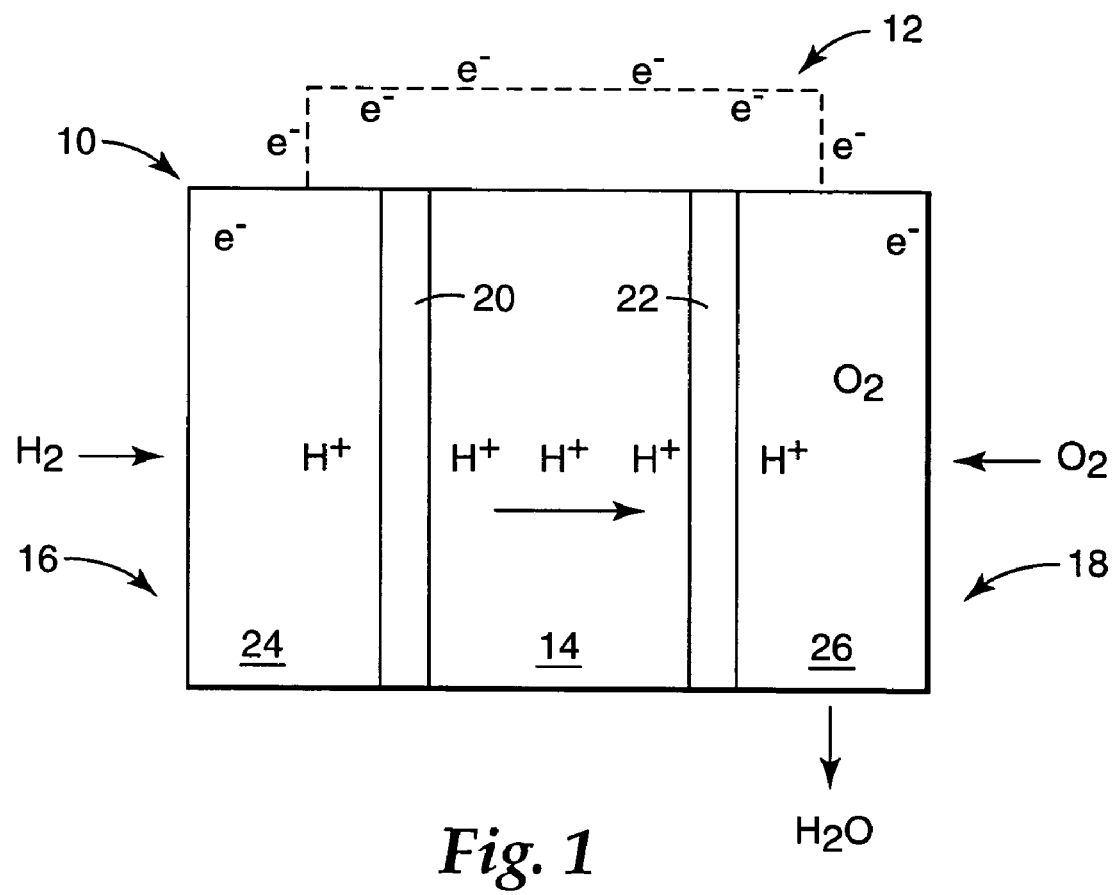
FIG. 1 is a schematic illustration of a membrane electrode assembly of the present invention in use with an external electrical circuit.

FIG. 1 is an illustration of MEA 10 in use with external electrical circuit 12, where MEA 10 includes electrolyte membrane 14 of the present invention. MEA 10 is suitable for use in electrochemical cells, such as PEM fuel cells, and further includes anode portion 16, cathode portion 18, catalyst layers 20 and 22, and gas diffusion layers 24 and 26. Anode portion 16 and cathode portion 18 generally refer to the anode and cathode sides of MEA 10.

Electrolyte membrane 14 is disposed between catalyst layers 20 and 22, where electrolyte membrane 14 and catalyst layers 20 and 22 may be a catalyst coated membrane. Electrolyte membrane 14 is thermally stable, and may be operated at high temperatures (e.g., up to 150° C.) for reducing carbon monoxide poisoning of catalyst layers 20 and 22, while exhibiting good proton conductivity.

Catalyst layer 20 is disposed between electrolyte membrane 14 and gas diffusion layer 24, where gas diffusion layer 24 is located at anode portion 16 of MEA 10. Similarly, catalyst layer 22 is disposed between electrolyte membrane 14 and gas diffusion layer 26, where gas diffusion layer 26 is located at cathode portion 18 of MEA 10. Gas diffusion layers 24 and 26 may each be any suitable electrically conductive porous substrate, such as carbon fiber constructions (e.g., woven and non-woven carbon fiber constructions). Gas diffusion layers 24 and 26 may also be treated to increase or impart hydrophobic properties.

During operation of MEA 10, hydrogen fuel ($H_2$) is introduced into gas diffusion layer 24 at anode portion 16. MEA 10 may alternatively use other fuel sources, such as methanol, ethanol, formic acid, and reformed gases. The fuel passes through gas diffusion layer 24 and over catalyst layer 20. At catalyst layer 20, the fuel is separated into hydrogen ions ($H^+$) and electrons ($e^-$). Electrolyte membrane 14 only permits the hydrogen ions to pass through to reach catalyst layer 22 and gas diffusion layer 26. The electrons cannot pass through electrolyte membrane 14. As such, the electrons flow through external electrical circuit 12 in the form of electric current. This current can power an electric load, such as an electric motor, or be directed to an energy storage device, such as a rechargeable battery. Oxygen ($O_2$) is introduced into gas diffusion layer 26 at cathode portion 18. The oxygen passes through gas diffusion layer 26 and over catalyst layer 22. At catalyst layer 22, oxygen, hydrogen ions, and electrons combine to produce water and heat.

Electrolyte membrane 14 of the present invention compositionally includes an acidic polymer and an acid. The terms "acidic polymer" and "acid" are used herein to define different components and are not used interchangeably (i.e., the term "acid" does not refer to the acidic polymer, and the term "acidic polymer" does not refer to the acid). The acidic polymer is thermally stable and includes bound-anionic functional groups such that, when the counter-ions to the bound-anionic functional groups are protons, the resulting acidic polymer has a pKa of less than about 5. Examples of suitable acidic polymers for use in electrolyte membrane 14 include fluoropolymers having pendant groups terminating in acidic groups. Suitable pendent groups for the fluoropolymer include sulfonic acid groups having the formula —$R^1$—$SO_3Y$, where $R^1$ may be a branched or unbranched perfluoroalkyl, perfluoroalkoxy, or perfluoroether group, which contains 1-15 carbon atoms and 0-4 oxygen atoms, and where Y is a hydrogen ion, a cation, or combinations thereof. Examples of suitable pendent groups include —$OCF_2CF(CF_3)OCF_2CF_2SO_3Y$, —$O(CF_2)_4SO_3Y$, and combinations thereof.

The fluoropolymer may also include one or more acidic endgroups, such as sulfonyl endgroups having the formula —$SO_3Y$. The backbone chain of the acidic polymer may be partially or fully fluorinated. Suitable fluorine concentrations in the backbone chain include about 40% or more by weight, based on the entire weight of the backbone chain. In one embodiment of the present invention, the backbone chain of the fluoropolymer is perfluorinated.

Examples of suitable concentrations of the acidic polymer in electrolyte membrane 14 range from about 50% by weight to about 95% by weight, with particularly suitable concentrations ranging from about 60% by weight to about 80% by weight. The weight percents of the acidic polymer are based on the entire weight of electrolyte membrane 14, not including any reinforcement matrix used in electrolyte membrane 14 (discussed below).

The acid is a low-volatility acid that is fluorinated, is either oligomeric or non-polymeric, and provides additional proton conductivity. The low volatility of the acid prevents the acid from evaporating at the high temperatures of MEA 10. Otherwise, the acid would evaporate and exit MEA 10 with the hydrogen and oxygen gas streams. A "low-volatility acid" is herein defined as an acid that, after being heated from 1° C. to 200° C. at a ramp rate of 10° C./minute, and then cooled to 120° C. within 5 minutes, exhibits a cumulative mass loss of about 6% or less, based on an initial weight of the acid, while being maintained at 120° C. for a 24 hour period, where the cumulative mass loss is measured during the 24 hour period. The cumulative mass loss may be measured with a thermal gravimetric analyzer (TGA). In one embodiment of the present invention, the acid exhibits a volatility that is lower than a volatility of concentrated (e.g., 95%-98% by weight) sulfuric acid.

"Oligomeric", with respect to the acid, is defined herein as an acid molecule that contains twenty acid-functional groups or less, and a molecular weight of less than 10,000. The acid desirably contains ten acid-functional groups or less per molecule, more desirably five acid-functional groups or less per molecule, and even more desirably two acid-functional groups per molecule.

In addition to having multiple acid-functional groups (i.e., multi-functional), the acid may also be perfluorinated to increase thermal stability, such as a perfluorinated bis-acid. The combination of the acid being non-polymeric and multi-functional increases the density of acid functional groups per molecule. This increases the proton conductivity of electrolyte membrane 14 beyond a level achievable with the polymeric acid alone.

In one embodiment of the present invention, the acid is also substantially free of basic groups, such as aromatic heterocyclic groups, which may undesirably compromise proton conductivity. For example, nitrogen heteroatoms are basic, which consume protons that are otherwise available for proton transport. Acids with aromatic heterocyclic groups are also expensive materials, which would increase the material costs for manufacturing electrolyte membrane 14.

Examples of suitable acids for use in electrolyte membrane 14 include sulfonic acids, imide acids, methide acids, and combinations thereof. Examples of particularly suitable acids for use in electrolyte membrane 14 include perfluorinated sulfonic acids, perfluorinated imide acids, and combinations thereof. Examples of suitable perfluorinated sulfonic acids include acids having the formula $HO_3S(CF_2)_nSO_3H$, where "n" ranges from 1-10 (e.g., a disulfonic acid having the formula $HO_3S(CF_2)_4SO_3H$, which is herein referred to as disulfonate or disulfonate acid). Examples of suitable perfluorinated imide acids include acids having the formula $C_mF_{2m+1}SO_2NHSO_2(CF_2)_nSO_2NHSO_2C_mF_{2m+1}$, where "m" ranges from 1-8 (e.g., $C_1$-bis-imide having the formula $CF_3SO_2NHSO_2(CF_2)_4SO_2NHSO_2CF_3$ and $C_4$-bis-imide having the formula $C_4F_9SO_2NHSO_2(CF_2)_4SO_2NHSO_2C_4F_9$).

Additional examples of suitable perfluorinated sulfonic acids and perfluorinated imide acids include the above-discussed acids, where the $(CF_2)_n$ groups and the $C_mF_{2m+1}$ groups include heteroatoms, such as nitrogen, oxygen, and combinations thereof. Additionally, further examples of suitable perfluorinated sulfonic acids and perfluorinated imide acids include the above-discussed acids, where the $(CF_2)_n$ groups and the $C_mF_{2m+1}$ groups are branched, linear, cyclic, and combinations thereof.

Examples of suitable concentrations of the acid in electrolyte membrane 14 range from about 5% by weight to about 55% by weight, with particularly suitable concentrations ranging from about 20% by weight to about 35% by weight. The weight percents of the acid are based on the entire weight of electrolyte membrane 14, not including any reinforcement matrix used in electrolyte membrane 14 (discussed below).

Electrolyte membrane 14 also desirably exhibits low concentrations of phosphoric acid. Phosphoric acid poisons platinum catalyst layers of fuel cells, which reduces their effectiveness. A typical solution to overcome the poisoning when using phosphoric acid involves increasing the concentration of the platinum catalyst layers to at least about two milligrams/centimeter$^2$ of platinum. This platinum concentration, however, is about 10-20 times greater than the desired platinum concentration, and substantially increases the raw material costs for manufacturing fuel cells. Accordingly, electrolyte membrane 14 desirably contains less than about 60% by weight phosphoric acid. More desirably, electrolyte membrane 14 contains less than about 25% by weight phosphoric acid. Even more desirably, electrolyte membrane 14 is substantially free of phosphoric acid.

Electrolyte membrane 14 may also include inorganic additives, such as proton conductive inorganic additives. Such additives allow electrolyte membrane 14 to exhibit good proton conductivity with lower a concentration of the acid. This is beneficial because acid washout is proportional to the concentration of the acid in electrolyte membrane 14, and because the inorganic additives further aid in retention of the acid. The acid also plasticizes the acidic polymer to maintain flexibility, and, in the case of particulate inorganic additives, provides conductive bridges between the inorganic additives. This is in contrast to prior membranes made by mixing polymers and inorganic additives, which may be brittle at the concentrations required for the adequate proton conductivity.

The inorganic additives may be particles or may be molecularly dispersed or dissolved in electrolyte membrane 14. Examples of suitable inorganic additives include metal oxide particles, such as silica (e.g., amorphous fumed silica and silica gel), zirconia, silica having silane-coupled sulfonic acid groups, zirconia having silane-coupled sulfonic acid groups, sulfated zirconia, zirconium phosphates, zirconium phosphonates, zirconium phosphate sulfophenylenephosphonate, mixed metal-oxide gels (e.g., silica-calcia-phosphorous oxide gels), mixed metal-oxide glasses, superprotonic conductors (e.g., hydrogensulfate and hydrogenphosphate salts of cesium), heteropolyacids, and combinations thereof. The particle shapes may be spherical, acicular, branched, plate-like, or fibrous.

Examples of suitable commercially available inorganic additives include amorphous fumed silicas available under the trade designation "CAB-O-SIL" from Cabot Corp., Tuscola, Ill.; amorphous fumed silicas and silica gels available from Alfa Aesar, Ward Hill, Mass. (e.g., Catalog Nos. 42737, 41502, and 42729); and a silica sol that is acid-stabilized and nominally free of anions, and available under the trade designation "NALCO 1042" from Nalco, Naperville, Ill.

Examples of suitable average particle sizes for the particulate inorganic additives range about 1 nanometer to about 10 micrometers, with particularly suitable average particle sizes ranging from about 5 nanometers to about 1 micrometer, and even more particularly suitable average particle sizes ranging from about 10 nanometers to 500 nanometers. The particulate inorganic additives may also mesoporous, such as those provided by surfactant templated synthesis (STS). Metal oxide sols that are free of stabilizing counter ions and that are transferred into a solvent for the acidic polymer, as discussed below, may also be used.

Examples of suitable concentrations of the inorganic additives in electrolyte membrane 14 range from about 1% by weight to about 60% by weight, with particularly suitable concentrations ranging from about 10% by weight to about 40% by weight. The weight percents of the inorganic additives are based on the entire weight of electrolyte membrane 14, not including any reinforcement matrix used in electrolyte membrane 14 (discussed below).

Electrolyte membrane 14 may also include oxidation stabilizers. Examples of suitable oxidation stabilizers for use in electrolyte membrane 14 include those disclosed in Asukabe et al., U.S. Pat. No. 6,335,112; Wessel et al., U.S. Patent Application Publication No. 2003/0008196; and Cipollini et al., U.S. Patent Application Publication No. 2004/0043283.

Electrolyte membrane 14 may also be reinforced mechanically using a reinforcement matrix, such as a woven cloth or non-woven, and which is made from materials resistant to acidic and oxidizing conditions at high temperatures. Examples of suitable resistant matrix materials include polymers such as polytetrafluoroethylene (PTFE), polyphenylene sulfide, polysulfones, polyetheretherketone (PEEK), fluorinated ethylene-propylene (FEP), polyvinylidenedifluoride, ter-polymers of PTFE, hexafluoropropylene, and vinylidene fluoride (THV), liquid crystalline polyesters, and glass and other ceramics stable in acidic environments. For lower operating temperatures, reinforcement matrices such as ultra-high-molecular weight polyethylene may also be used.

The reinforcement matrix desirably exhibits an average pore size greater than about 0.01 micrometer. When electrolyte membrane 14 includes inorganic additives, the reinforcement matrix desirably exhibits a large average pore size to allow the inorganic additives to pass through without hindrance. Examples of suitable average pore sizes for the reinforcement matrix include sizes that are at least ten times greater than the average particle size of the inorganic additives. Examples of particularly suitable average pore sizes for the reinforcement matrix include sizes that are at least twenty times greater than the sizes of the largest inorganic additives. This allows uniform filling of the reinforcement matrix.

Examples of suitable reinforcement matrices with smaller pore sizes include matrices made from polymers having adequate thermal and chemical stability under highly acidic, oxidizing conditions at temperatures up to 150° C., such as expanded polytetrafluoroethylene, polyethersulfone, and other polymers having aromatic backbones or fluorinated backbones. Ultra-high-molecular weight polyethylene may also be used.

Electrolyte membrane 14 may be formed by initially blending the acidic polymer, the acid, and optionally the inorganic additives. Prior to blending, the acidic polymer may be dissolved or dispersed in a liquid to form an acidic polymer solution/dispersion, where the liquid used may vary based on the acidic polymer. Examples of suitable liquids include 1-methyl-2-pyrrolidinone, dimethylacetamide, methanol, methane sulfonic acid, n-propanol, water, and combinations thereof. Small quantities of other liquids for the acidic polymer may also be used to assist dissolving or dispersing other components or maintaining stable suspensions of inorganic additives. The acid may be dissolved in the same liquid used for the acidic polymer to form an acid solution. The acidic polymer solution/dispersion and the acid solution may then be blended together to form a blended solution or dispersion, which may be further degassed to remove any entrained bubbles.

The inorganic additives may be dispersed with the acidic polymer solution/dispersion, the acid solution, or with both the acidic polymer solution/dispersion and the acid solution. The inorganic additives may be dispersed in the acidic polymer solution/dispersion using standard dispersion techniques that provide sufficient shear to disperse the inorganic additives in the acidic polymer solution/dispersion. Additionally, the dispersion techniques may also reduce the particle sizes of the inorganic additives to assist in dispersion process. Examples of suitable dispersion techniques are disclosed in Temple C. Patton, *Paint Flow and Pigment Dispersion*, $2^{nd}$ Ed., John Wiley & Sons, 1979. Adsorption of atmospheric water during the dispersion process is also desirably minimized, since water is generally a non-solvent for the acidic polymer.

Sols of inorganic materials in organic solvents may be dispersed with either the acidic polymer solution/dispersion or the acid solution before blending, or dispersed in the blended solution/dispersion. For example, silica and zirconia sols may be transferred from their native aqueous solvent to 1-methyl-2-pyrrolidinone by adding 1-methyl-2-pyrrolidinone and n-propanol to the sol. The sols may then be blended with the acidic polymer solution/dispersion or the acid solution.

After blending, the blended mixture may then be applied to a surface (e.g., a glass plate) and dried to form electrolyte membrane 14. This may be performed by applying the blended mixture to the surface and spreading the blended mixture. The coating may then be dried in an oven to remove the solvent. After removal from the oven, the resulting electrolyte membrane 14 may be allowed to stand in open air to cool.

In one embodiment of the present invention, electrolyte membrane 14 may also be cross-linked using a variety of cross-linking techniques, such as photochemical, thermal, and electron-beam techniques. Examples of suitable cross-linking techniques include electron-beam, infrared, and ultraviolet cross-linking. The cross-linking may be performed in the presence of one or more cross-linking agents. Suitable cross-linking agents for use with the fluoropolymers of the present invention include multifunctional compounds, such as multifunctional alkenes and other unsaturated cross-linkers. The cross-linking agents may be non-fluorinated, fluorinated to a low level, highly fluorinated, or more preferably, perfluorinated. The cross-linking agents may introduced to the composition of electrolyte membrane 14 by any conventional manner. A suitable technique for introducing the cross-linking agent includes blending the cross-linking agent with the composition of electrolyte membrane 14 before forming the composition into a membrane. Alternatively, the cross-linking agent may be applied to electrolyte membrane 14, such as by immersing electrolyte membrane 14 in a solution of the cross-linking agent.

Electrolyte membrane 14 may also be inserted into a reinforcement matrix by pressing, coating, filling, or laminating (or combinations thereof) electrolyte membrane 14 on one or both sides of the matrix. When pressing or filling the reinforcement matrix, the reinforcement matrix desirably exhibits pore sizes greater than about 25 micrometers. The suitable pore size is generally dependent on the viscosity of the polymer melt and the pressing conditions. Examples of suitable pressing conditions include pressing for about 5 minutes at a pressure ranging from 6.9 megapascals (about 1000 pounds/inch$^2$) to about 34.5 megapascals (about 5000 pounds/inch$^2$). When filling a reinforcement matrix that is not penetrated by a solution of the components of electrolyte membrane 14 (e.g., expanded PTFE), the reinforcement matrix may be pre-filled with a solvent suitable for the basic polymer of electrolyte membrane 14, which completely penetrates the reinforcement matrix. The reinforcement matrix increases the structural integrity of electrolyte membrane 14 for use in MEA 10.

As discussed above, electrolyte membrane 14 exhibits good proton conductivity under low levels of humidification. While not wishing to be bound by theory, it is believed that proton conductivity through an electrolyte membrane increases as the level of humidification increases. If the level of humidification is reduced, such as by evaporation at operating temperatures greater than 100° C., the proton conductivity diminishes. This correspondingly reduces the overall electrical output of the electrochemical device. One common technique to maintain the desired humidity level within the electrochemical device is to humidify the inlet gas streams. However, humidification of the inlet gas streams reduces the concentration of reactive gases, which also reduces the overall electrical output of the electrochemical device. Another alternative technique involves pressurizing the inlet gas streams to increase the relative humidity within the electrochemical device. However, pressurization imparts a degree of parasitic power loss, which also decreases the overall electrical output.

Electrolyte membrane 14, however, exhibits good proton conductivity under low levels of humidification. This allows MEA 10 to operate at temperatures greater than 100° C. with low humidification of the gas stream. In one embodiment of the present invention, MEA 10 may operate with inlet gas streams having a dew point of 80° C. or less at atmospheric pressure, which provides a 0.3% relative humidity at 120° C. This allows a high concentration of the reactive gases to be used in MEA 10 while also preserving proton conductance through electrolyte membrane 14 at high operating temperatures.

The composition of electrolyte membrane 14 is also suitable for use in a catalyst ink, which may be coated on electrolyte membrane 14 to form catalyst layers 20 and 22. The membrane composition may be formed in the same manner as discussed above, and then dispersed in an aqueous and/or alcohol carrier liquid. Catalyst particles (e.g., carbon particles and catalyst metals) may also be combined with the dispersed membrane composition to form the catalyst ink. The catalyst ink may then be coated on electrolyte membrane 14, and the carrier liquid may be removed, to form catalyst layers 20 and 22 on electrolyte membrane 14 (i.e., a catalyst coated membrane). As a result, catalyst layers 20 and 22 may each include the above-discussed composition of electrolyte membrane 14, and are correspondingly thermally stable and exhibit good proton conductivity for use in electrochemical devices.

EXAMPLES

The present invention is more particularly described in the following examples that are intended as illustrations only, since numerous modifications and variations within the scope of the present invention will be apparent to those skilled in the art. Unless otherwise noted, all parts, percentages, and ratios reported in the following examples are on a weight basis, and all reagents used in the examples were obtained, or are available, from the chemical suppliers described below, from general chemical suppliers such as Sigma-Aldrich Company, Saint Louis, Mo., or may be synthesized by conventional techniques.

The following compositional abbreviations are used in the following Examples:

3M PFSA: A perfluorosulfonic acid copolymer with a 1000 equivalent weight of gaseous tetrafluoroethylene comonomer (TFE) having a formula $CF_2=CF_2$ and a molecular weight of 100.02, and a sulfonyl fluoride comonomer (MV4S) having a formula $CF_2=CFO(CF_2)_4SO_2F$ and a molecular weight of 378.11, where the MV4S was prepared as described in U.S. Pat. No. 6,624,328 (in a hydrolyzed sulfonic acid form), and where the perfluorosulfonic acid copolymer was prepared as described in U.S. Patent Application No. 2004/0121210, and which is manufactured by 3M Corporation, St. Paul, Minn.

NAFION: A 20% acidic polymer dispersion in 60/40 n-propanol/water, which is commercially available under the trade designation "NAFION 1000" (SE20092) from DuPont Chemicals, Wilmington, Del.

Disulfonate: Disulfonate acid with the formula $HO_3S(CF_2)_4SO_3H.4H_2O$, which is synthesized as discussed below.

$C_1$-bis-imide: A bis-imide acid with the formula $CF_3SO_2NHSO_2(CF_2)_4SO_2NHSO_2CF_3.4H_2O$, which is synthesized as discussed below.

$C_4$-bis-imide: A bis-imide acid with the formula $C_4F_9SO_2NHSO_2(CF_2)_4SO_2NHSO_2C_4F_9.4H_2O$, which is synthesized as discussed below.

The synthesis of disulfonate acid, $C_1$-bis-imide acid, and $C_4$-bis-imide acid were performed as follows:

Disulfonate Acid

Disulfonate acid used in the following Examples was synthesized pursuant to the following procedure. 126.1 grams of $LiOH.H_2O$, 130.0 grams of deionized water, and 130.0 grams of methanol were charged to a 3.0 liter 3-necked flask equipped with a mechanical stirrer, addition funnel, Claisen adapter, reflux condenser and thermocouple probe. The mixture was chilled to about 0° C. in an ice bath. Liquid $FSO_2(CF_2)_4SO_2F$ was then gradually added from the addition funnel while stirring. The addition rate was adjusted so the temperature from the reaction exotherm was controlled between 56° C. and 75° C. Once the reaction exotherm subsided, a heating mantle was installed and the reaction temperature was held at 60° C. overnight to drive the hydrolysis to completion.

After cooling to room temperature, the reaction solution was treated with dry ice pellets for about one hour while controlling reaction temperature at 30° C., and while stirring to convert excess LiOH to lithium carbonate. The reaction solution was then allowed to cool overnight.

After the overnight cooling, the reaction solution was treated with 5.6 grams of Celite at room temperature while stirring. The reaction solution was then filtered by suction through a pad of Celite to recover the filtrate. The filtrate was evaporated to dryness on a rotary evaporator at 20 mmHg and 100° C. to yield a white solid. The white solid was dissolved in 500 milliliters of pure anhydrous methanol to produce a cloudy solution that was filtered again by suction to give a clear filtrate. The clear filtrate was evaporated to dryness on a rotary evaporator at 20 mmHg and 100° C. to yield 279 grams of white solid dilithium salt. The white solid was then dissolved in 840 grams of deionized water and the resulting clear solution was subjected to proton exchange in eight 140-gram portions on a freshly prepared 34-cemtimeter×4-centimeter column of Mitsubishi SKT10 proton exchange resin. Deionized water was used as the eluent. The aqueous solutions of disulfonic acid collected from the proton exchange column were evaporated to dryness on a rotary evaporator at 20 mmHG and 100° C., which produced a 92% yield (272 grams) of $HOSO_2(CF_2)_4SO_2OH.4H_2O$ as a slightly off-white solid. The purity was shown to be better than 99% according to quantitative $^1H$ and $^{19}F$-NMR analysis in $CD_3OD$.

$C_1$-Bis-Imide Acid $C_1$-bis-imide acid used in the following Examples was synthesized pursuant to the following procedure. 305 grams of anhydrous $C_4F_9SO_2NH_2$, 221 grams of anhydrous triethylamine, and 188 grams of liquid $FSO_2(CF_2)_4SO_2F$ were charged to a 2.0 liter 3-necked flask equipped with a mechanical stirrer, addition funnel, Claisen adapter, water cooled reflux condenser, heating mantle and thermocouple probe. A moderate reaction exotherm caused self-heating of the reaction solution to 80° C. After the reaction exotherm subsided, the reaction temperature was gradually ramped to 92° C.-99° C. (mild reflux) while stirring and held at this temperature for 21 hours. The resulting orange brown reaction solution was allowed to cool to room temperature while stirring. The reaction solution was then combined with 716 grams of methylene chloride.

The methylene chloride solution of crude product was transferred to a separatory funnel and washed with four 800-milliliter portions of deionized water. After the final water wash, the lower methylene chloride phase was drained to a 2.0 liter, 3-necked flask and combined with 1.0 liter of deionized water. The flask was fitted with a short path distillation head and all methylene chloride was removed by distillation with mechanical stirring at atmospheric pressure. Once all methylene chloride was removed, 44.85 grams of $LiOH.H_2O$ was added to the contents remaining in the distillation pot while stirring. Distillation was then resumed to remove liberated triethylamine and sufficient water to concentrate the dilithium salt of bis-imide to approximately 50% by weight in water. The resulting aqueous solution of the dilithium bis-imide salt was allowed to cool to room temperature.

The aqueous solution was then treated with 16 grams of DARCO G-60 (American Norit Company, Inc., Atlanta, Ga.) decolorizing carbon while stirring and then filtered by suction through a Celite pad to remove carbon and other insoluble particulates. The recovered filtrate was a dark red-brown liquid weighing 892 grams and containing 48.2% non-volatile solids. This solution was divided into nine portions of equal mass, and each portion was individually subjected to proton exchange on a freshly prepared 34-cemtimeter×4-centimeter column of Mitsubishi SKT10 proton exchange resin. Deionized water was used as the eluent. The aqueous solutions of di-imide acid collected from the proton exchange column were filtered by suction and then evaporated to dryness on a rotary evaporator at 20 mmHg at 100° C. to produce about a 90% yield (409 grams) of crude $C_4F_9SO_2NHSO_2(CF_2)_4SO_2NHSO_2C_4F_9.4H_2O$ as a light brown solid.

This crude product was purified by redissolution in water and neutralization with an excess of aqueous potassium hydroxide to cause crystallization of the dipotassium di-imide salt. The suspension of crystals was filtered by suction at 0° C. through a sintered glass frit and washed with water. The recovered solid was recrystallized two more times from hot water at about 26% solids producing a 90% overall yield of dipotassium salt as an off-white crystalline solid. The purified dipotassium salt was then converted back to the di-imide acid by dissolution in 50:50 methanol/water at 14.5% solids, and subjecting this solution (in 255-gram portions) to proton exchange chromatography as discussed above, but this time using 50:50 methanol/water as the eluent. The eluted methanol/water solution of product was evaporated to dryness on a rotary evaporator at 20 mmHg at 100° C. producing about an 80% yield of purified $C_4F_9SO_2N(H)SO_2(CF_2)_4SO_2N(H)SO_2C_4F_9.4H_2O$ as an off-white solid. The purity was shown to be better than 99% according to quantitative $^1H$ and $^{19}F$-NMR analysis in $CD_3OD$.

$C_4$-Bis-Imide Acid $C_4$-bis-imide acid used in the following Examples was prepared pursuant to the procedure discussed above for the $C_1$-bis-imide acid, except that anhydrous $CF_3SO_2NH_2$ was used in place of $C_4F_9SO_2NH_2$ as the reagent. The purity of the final di-imide acid was shown to be 94.3% according to quantitative $^1H$ and $^{19}F$-NMR analysis in $CD_3OD$.

Examples 1-10 and Comparative Examples A and B

An electrolyte membrane of Example 1 was prepared pursuant to the following procedure. 0.27 grams of disulfonate was added to 10.00 grams of 3M PFSA, where the 3M PFSA was 20% by weight solids in a 70/30 n-propanol/water solvent. The mixture was shaken to dissolve and then degassed to remove bubbles. The clear viscous solution was then hand-coated on a glass plate using a 25-mil gap stainless steel applicator (BYK Gardner). The wet coating was then dried at 80° C. for 10-20 minutes and annealed at 160° C.-200° C. for an additional 5-10 minutes. The resulting electrolyte membrane had a 10% by weight concentration of disulfonate, and exhibited a clear/light brown color, and had a thickness of about 25-76 micrometers (about 1-3 mils).

Electrolyte membranes of Examples 2 and 3 were prepared pursuant to the procedure discussed above for Example 1, except that the amounts of disulfonate added were increased. Similarly, electrolyte membranes of Examples 4-9 were prepared pursuant to the procedure discussed above for Example 1, except that $C_1$-bis-imide or $C_4$-bis-imide were used instead of disulfonate. Comparative Example A included 3M PFSA with no acid added.

An electrolyte membrane of Example 10 was also prepared pursuant to the procedure discussed above for Example 1, except that NAFION was used instead of 3M PFSA. Comparative Example B included NAFION with no acid added. Table 1 provides the components and the concentrations of the acids (based on the entire weight of the given electrolyte membrane) for the electrolyte membranes of Examples 1-10 and Comparative Examples A and B.

TABLE 1

| Example | Acidic Polymer | Acid | Percent by Weight of Acid |
|---|---|---|---|
| Comparative Example A | 3M PFSA | None | 0 |
| Example 1 | 3M PFSA | Disulfonate | 10 |
| Example 2 | 3M PFSA | Disulfonate | 20 |
| Example 3 | 3M PFSA | Disulfonate | 35 |
| Example 4 | 3M PFSA | $C_1$-bis-imide | 20 |
| Example 5 | 3M PFSA | $C_1$-bis-imide | 30 |
| Example 6 | 3M PFSA | $C_1$-bis-imide | 40 |
| Example 7 | 3M PFSA | $C_4$-bis-imide | 27 |
| Example 8 | 3M PFSA | $C_4$-bis-imide | 40 |
| Example 9 | 3M PFSA | $C_4$-bis-imide | 48 |
| Comparative Example B | NAFION | None | 0 |
| Example 10 | NAFION | Disulfonate | 26 |

Conductivity Testing of Examples 1-10 and Comparative Examples A and B

The conductivities of the electrolyte membranes of Examples 1-10 and Comparative Examples A and B were quantitatively measured by the following procedure. AC impedance was measured using a four-point probe conductivity cell from BekkTech (Loveland, Colo.) on a 1-centimeter×3-centimeter sample of the electrolyte membrane. The conductivity cell was electrically connected to a potentiostat (Model 273, Princeton Applied Research) and an Impedance/Gain Phase Analyzer (SI 1260, Schlumberger). The sample was first conditioned in the cell for 5 hours at 120° C. with an 80° C. dew point (less than 0.3% relative humidity). AC impedance measurements were then performed using Zplot and Zview software (Scribner Associates).

AC impedance measurements were then performed at different temperatures after conditioning for one hour (all at constant 80° C. dew point). The electrolyte membranes of Examples 1-9 and Comparative Example A were measured at 80° C. (100% relative humidity) and 120° C. (less than 0.3% relative humidity). The electrolyte membranes of Example 10 and Comparative Example B were measured at 110° C. (less than 1% relative humidity), and 120° C. (less than 0.3% relative humidity). For each sample, the ionic (in this case is proton) conductivity was calculated from the average AC impedance at high frequency by following the formula, where "R" is the AC impedance measurement, "L" is the length of the sample, and "A" is the cross-sectional area of the sample:

$$\text{Conductivity} = \left(\frac{1}{R}\right)\left(\frac{L}{A}\right)$$

Table 2 provides the conductivity results for the electrolyte membranes of Examples 1-9 and Comparative Example A, Table 3 provides the conductivity results for the electrolyte membranes of Example 10 and Comparative Example B, where the conductivities are noted in units of millisiemens/centimeter (mS/cm).

TABLE 2

| Example | Percent by Weight of Acid | Conductivity (80° C.) | Conductivity (120° C.) |
|---|---|---|---|
| Comparative Example A | 0 | 135 | 9 |
| Example 1 | 10 | 239 | 8 |
| Example 2 | 20 | 262 | 10 |
| Example 3 | 35 | 219 | 9 |
| Example 4 | 20 | 226 | 9 |
| Example 5 | 30 | 226 | 10 |
| Example 6 | 40 | 190 | 12 |
| Example 7 | 27 | 68 | 17 |
| Example 8 | 40 | 67 | 18 |
| Example 9 | 48 | 110 | 21 |

TABLE 3

| Example | Percent by Weight of Acid | Conductivity (110° C.) | Conductivity (120° C.) |
|---|---|---|---|
| Comparative Example B | 0 | 9 | 4 |
| Example 10 | 26 | 20 | 11 |

The data provided in Tables 2 and 3 illustrate the benefit of adding an acid to the electrolyte membrane. For example, at 80° C. the electrolyte membrane of Example 1 (10% by weight disulfonate) exhibited a conductivity that was substantially greater the conductivity of the electrolyte membrane of Comparative Example A (no acid). Moreover, disulfonate generally provided the greater conductivities with 3M PFSA compared to $C_1$-bis-imide or $C_4$-bis-imide.

The data provided in Tables 2 and 3 also show that low levels of humidification and higher temperatures significantly reduce conductivities. For example, the electrolyte membranes of Examples 1-9 and Comparative Example A exhibited significantly greater conductivities at 80° C. (100% relative humidity) compared to 120° C. (less than 0.3% relative humidity). Nonetheless, at 120° C., the electrolyte membranes that contained the acids generally exhibited greater conductivities than the electrolyte membranes of Comparative Examples A and B, particularly the electrolyte membranes of Examples 7-9.

AC Impedance Testing of Example 10 and Comparative Example B

AC impedances of the electrolyte membranes of Example 10 and Comparative Example B were quantitatively measured as a function of time pursuant to the following procedure. AC impedance was measured using a four-point probe conductivity cell from BekkTech (Loveland, Colo.) on a 1-centimeter×3-centimeter sample of the electrolyte membrane. The conductivity cell was electrically connected to a potentiostat (Model 273, Princeton Applied Research) and an Impedance/Gain Phase Analyzer (SI 1260, Schlumberger). The sample was first conditioned in the cell for 5 hours at 120° C. with an 80° C. dew point (less than 0.3% relative humidity). AC impedance measurements were then performed using Zplot and Zview software (Scribner Associates).

AC impedance measurements were then performed at different temperatures after conditioning for one hour, 10 hours, 15 hours, and 20 hours (all at constant 80° C. dew point). The electrolyte membrane of Example 10 was measured at 80° C. (100% relative humidity), 90° C. (39% relative humidity), and 100° C. (less than 1% relative humidity). The electrolyte membrane of Comparative Example B was measured at 110° C. (less than 1% relative humidity). Table 4 provides the AC impedance results for the electrolyte membranes of Example 10 and Comparative Example B, where the AC impedance results are noted in units of ohms.

TABLE 4

| Example | Temperature (° C.) | AC Impedance (1 hour) | AC Impedance (10 hours) | AC Impedance (15 hours) | AC Impedance (20 hours) |
|---|---|---|---|---|---|
| Comparative Example B | 110 | 2345 | 1644 | 1611 | 1610 |
| Example 10 | 100 | 790 | 780 | 738 | 720 |
| Example 10 | 90 | 327 | 434 | 435 | 434 |
| Example 10 | 80 | 150 | 204 | 243 | 226 |

The data in Table 4 illustrate the continued conductivity of the electrolyte membrane of Example 10 over time. As shown, the electrolyte membrane of Example 10 generally showed little change in resistance over the 20 hour period at all temperatures. For the electrolyte membrane of Example 10 measured at 100% relative humidity (80° C. temperature), the increase in resistance over time indicates that the disulfonate was beginning to leach out of the electrolyte membrane. Nonetheless, the electrolyte membrane of Example 10 continued to exhibit low resistances over time, which shows that the electrolyte membranes of the present invention continue to exhibit good proton conductivity over time.

Fuel Cell Evaluation

An evaluation of the electrolyte membranes of Example 1 and Comparative Example A under fuel cell conditions were each performed pursuant to the following procedure. A 5-layer MEA was made using the electrolyte membrane, which was disposed between a pair of catalyst layers and a pair of gas diffusion layers in the same manner as discussed above in FIG. 1. The MEA had an active surface area of 50 centimeters$^2$, and was symmetrically disposed around the electrolyte membrane. The area of the electrolyte membrane was cut to be 100 centimeters$^2$ so that the electrolyte membrane was configurable over a gasket to form a gas seal. The electrolyte membrane also had a layer thickness of 30.5 micrometers.

The catalyst layers and the gas diffusion layers were provided as one lot of machine coated catalyst layer on a roll of gas diffusion layer as described in patent application Velamakanni et al., U.S. Patent Application Publication No. 2004/0107869. The catalyst was a commercially available as a 50% platinum catalyst on a high surface area carbon, purchased from Nippon Engelhard Catalyst Corporation, Japan. The binder of the catalyst consisted of 1100 equivalent weight NAFION (DuPont, Wilmington, Del.) with an ionomer to carbon ratio of 0.8. The mass loading of the coating was 0.4 milligrams/centimeter$^2$ platinum. The MEA was assembled in a 50-centimeter$^2$ cell purchased from Fuel Cells Technologies, NM. The gasket was a PTFE, glass fiber reinforced, gasket commercially available from Nott Corporation, MN, and had a caliper 70% of the caliper of the catalyst coated layer, which lead to a 30% compression. The MEA was formed by bonding the seven layer (i.e., the five layers and two gaskets) by pressing the sample at a total pressure of 907 kilograms (i.e., 1 ton) between platens heated to 132° C. for ten minutes.

The flow field used was a standard Fuel Cell Technologies, NM 50-centimeter$^2$ quad serpentine. The cell was bolted together with a torque wrench setting of 110 foot-pounds. The test station included mass flow controllers (MKS, MA) to regulate flow, HPLC pumps (Lab Alliance, Pennsylvania) to meter in water that was vaporized in an ejector to hit the set point gas humidification, temperature controllers (Love Controls, IN), and electronics (Agilent, CA) to measure and control the current voltage performance of the cell. A computer running LabVIEW-based software (National Instruments, Austin, Tex.) controlled the station and data collection. Electrochemical impedance measurements were used to measure the MEA resistance of the sample under test. A fast Fourier transform method was used in which a square wave signal was sent across the fuel cell test circuit, which included a shunt resistor that served as the reference.

The script used to test the samples consisted of there different phases: incubation, humidity challenge, and aging. The fuel cell was heated to 80° C. under dry gas flows for twenty minutes. At that point the gas streams were humidified to 70° C. dew point and the incubation was begun. The flow conditions were $H_2$/air (800/1800 standard cubic centimeters) with ambient pressure outlets. The incubation lasted for six hours, and then polarization scans were taken running from 0.9 to 0.3 volts, step 0.05 volts, with a twenty second dwell time. Between polarization scans the cell was held at 0.5 volts for 5 minutes. A humidity challenge was used to differentiate performance between electrolyte membranes. The humidity challenge consisted of a series of constant current 0.5 amps/centimeter$^2$ scans under constant gas flow and constant gas humidification with only the cell temperature changing. The gas flow conditions were $H_2$/Air, constant stoichiometry 1.5/2.5, 80° C. dew point, and with ambient outlet pressures. The cell temperature was incremented from 85° C. to 100° C. in 3° C. steps. Three fifteen-minute scans were taken at each temperature of which measurements were taken during the last scan every minute of that scan. The value of comparison was the voltage recorded in the last scan.

Figure 2:
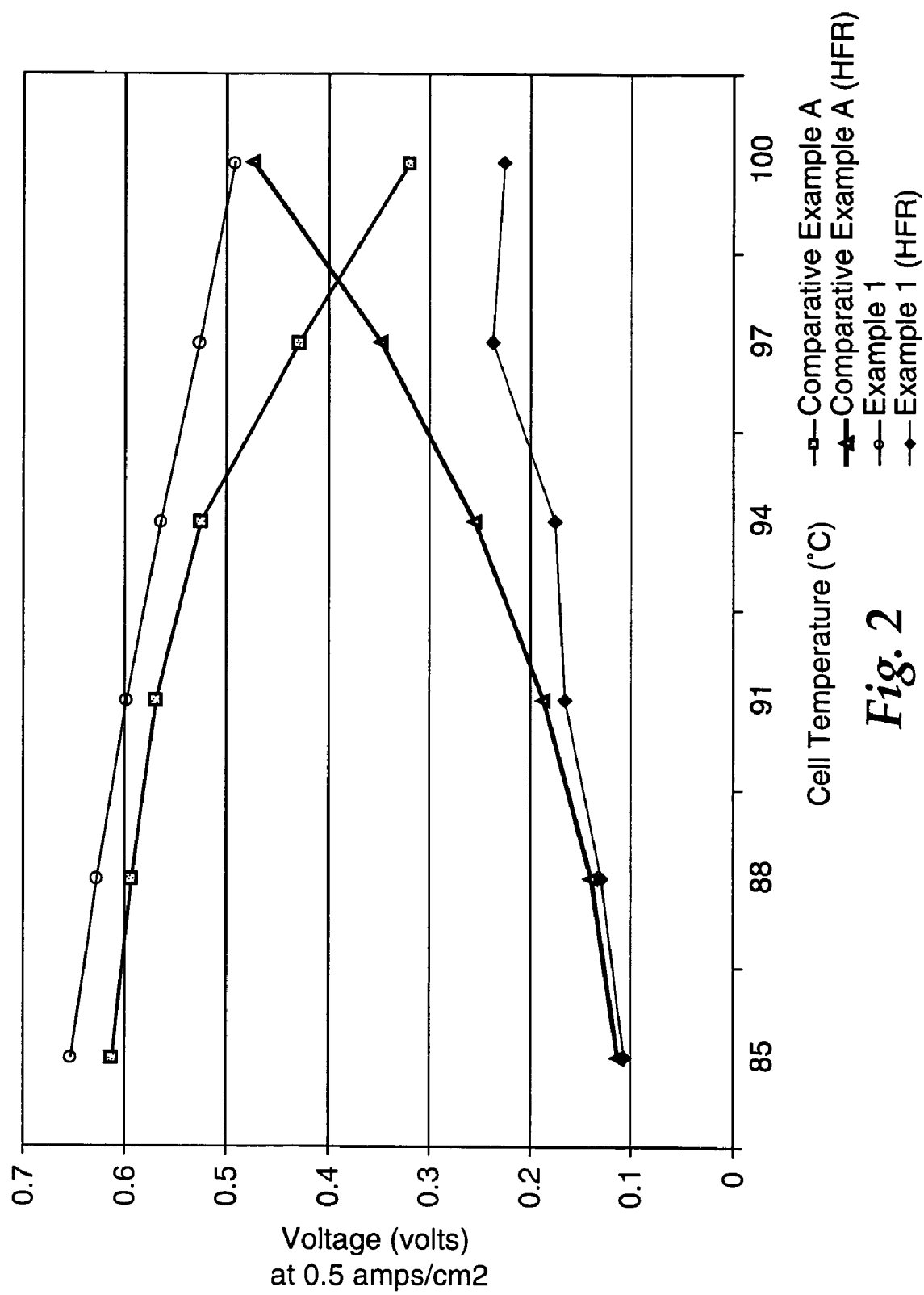
FIG. 2 is a graph illustrating polarization curves of an exemplary electrolyte membrane of the present invention and a comparative electrolyte membrane.

FIG. 2 is a graph illustrating polarization curves of the electrolyte membranes of Example 1 and Comparative Example A. The graph shows the voltages recorded at the varying temperatures during the fuel cell evaluations, and high frequency resistances (HFR) recorded for each electrolyte membrane, which used the same Y-axis scale as the voltages, but were recorded in units of ohms-centimeter$^2$.

The data in the FIG. 2 show that as the cell temperature increased, the proton conductivities of the electrolyte membranes of Example 1 and Comparative Example A decreased. However, at temperatures above 94° C., the electrolyte membrane of Comparative Example A exhibited a greater drop in proton conductivity compared to the electrolyte membrane of Example 1. Similarly, at temperatures above 91° C., the electrolyte membrane of Comparative Example A exhibited a greater increase in HFR compared to the electrolyte membrane of Example 1. The higher proton conductivities and lower HFR exhibited by the electrolyte membrane of Example 1 are believed to be due to the addition of the disulfonate acid. The combination of the acidic polymer and the acid allowed the electrolyte membrane of Example 1 to exhibit good conductivities at elevated temperatures.

Although the present invention has been described with reference to preferred embodiments, workers skilled in the art will recognize that changes may be made in form and detail without departing from the spirit and scope of the invention.

The invention claimed is:

1. An electrolyte membrane comprising:
   an acidic polymer; and
   a fluorinated acid that is substantially free of basic groups, wherein the fluorinated acid contains 20 acid-functional groups or less per molecule and has a molecular weight of less than 10,000, and wherein, after being heated from 1° C. to 200° C. at a ramp rate of 10° C./minute, and then cooled to 120° C. within 5 minutes, the fluorinated acid exhibits a cumulative mass loss of about 6% or less, based on an initial weight of the fluorinated acid, while being maintained at 120° C. for a 24 hour period, the cumulative mass loss being measured during the 24 hour period, and wherein the electrolyte membrane contains less than about 60% by weight phosphoric acid.

2. The electrolyte membrane of claim 1, wherein the acidic polymer comprises a polysulfonated fluoropolymer.

3. The electrolyte membrane of claim 2, wherein the acidic polymer comprises a highly fluorinated backbone and pendant groups, wherein the pendent groups are selected from the group consisting of —OCF$_2$CF(CF$_3$)OCF$_2$CF$_2$SO$_3$Y, —O(CF$_2$)$_4$SO$_3$Y and combinations thereof, wherein Y is selected from the group consisting of a hydrogen ion, a cation, and combinations thereof.

4. The electrolyte membrane of claim 1, wherein the fluorinated acid comprises a bis-acid.

5. The electrolyte membrane of claim 1, wherein the fluorinated acid is selected from the group consisting of imide acids, sulfonic acids, and combinations thereof.

6. The electrolyte membrane of claim 1, wherein the fluorinated acid is selected from the group consisting of HO$_3$S(CF$_2$)$_n$SO$_3$H, C$_m$F$_{2m+1}$SO$_2$NHSO$_2$(CF$_2$)$_n$SO$_2$NHSO$_2$C$_m$F$_{2m+1}$, compounds thereof where the (CF$_2$)$_n$ group comprises a first heteroatom, compounds thereof where the C$_m$F$_{2m+1}$ group comprises a second heteroatom, and combinations thereof, wherein n ranges from 1-10 and m ranges from 1-8, and wherein the first heteroatom and the second heteroatom are each selected from the group consisting of oxygen and nitrogen.

7. The electrolyte membrane of claim 1, wherein the electrolyte membrane contains less than about 25% by weight phosphoric acid.

8. The electrolyte membrane of claim 7, wherein the electrolyte membrane is substantially free of phosphoric acid.

9. The electrolyte membrane of claim 1, further comprising inorganic additives.

10. The electrolyte membrane of claim 9, wherein the inorganic additives are mesoporous.

11. The electrolyte membrane of claim 1, further comprising a reinforcement matrix.

12. A method of forming an electrolyte membrane, the method comprising:

blending an acidic polymer and a fluorinated acid, wherein the fluorinated acid is substantially free of basic groups, contains 20 acid-functional groups or less per molecule, and has a molecular weight of less than 10,000, and wherein, after being heated from 1° C. to 200° C. at a ramp rate of 10° C./minute, and then cooled to 120° C. within 5 minutes, the fluorinated acid exhibits a cumulative mass loss of about 6% or less, based on an initial weight of the fluorinated acid, while being maintained at 120° C. for a 24 hour period, the cumulative mass loss being measured during the 24 hour period; and forming a film from the blend.

13. The method of claim 12, wherein the acidic polymer, the fluorinated acid, or the acidic polymer and the fluorinated acid are provided in the form of a solution in solvent prior to blending.

14. The method of claim 12, further comprising dispersing inorganic additives into at least one of the acidic polymer, the fluorinated acid, or the blend of acidic polymer and the fluorinated acid.

15. The method of claim 12, wherein the fluorinated acid comprises a bis-acid.

16. The method of claim 12, wherein the fluorinated acid is selected from the group consisting of perfluorinated sulphonic acids, perfluorinated imide acids, and combinations thereof.

17. The method of claim 12, wherein the acidic polymer comprises polysulfonated fluoropolymer.

18. The method of claim 13, and further comprising inserting the film into a reinforcement matrix, wherein the inserting the film is selected from the groups consisting of pressing the film into the reinforcement matrix, coating the reinforcement matrix with the film, laminating the reinforcement matrix with the film, and combinations thereof.

* * * * *

UNITED STATES PATENT AND TRADEMARK OFFICE
CERTIFICATE OF CORRECTION

PATENT NO. : 7,517,604 B2  Page 1 of 2
APPLICATION NO. : 11/230090
DATED : April 14, 2009
INVENTOR(S) : Steven J. Hamrock It is certified that error appears in the above-identified patent and that said Letters Patent is hereby corrected as shown below:

Title Page, Page 2, OTHER PUBLICATIONS,
Line 20; delete "*Florine*" and insert --*Fluorine*-- therefor.

Column 8
Line 54; delete "$HO_3S(CF_2)_4SO_3H \cdot 4H_2O$"
and insert --$HO_3S(CF_2)_4SO_3H \bullet 4H_2O$-- therefor.

Line 56; delete "$CF_3SO_2NHSO_2(CF_2)_4SO_2\ NHSO_2CF_3 \cdot 4H_2O$"
and insert --$CF_3SO_2NHSO_2(CF_2)_4SO_2\ NHSO_2CF_3 \bullet 4H_2O$-- therefor.

Line 59; delete "$C_4F_9SO_2NHSO_2(CF_2)_4\ SO_2NHSO_2C_4F_9 \cdot 4H_2O$"
and insert --$C_4F_9SO_2NHSO_2(CF_2)_4\ SO_2NHSO_2C_4F_9 \bullet 4H_2O$-- therefor.

Line 67; delete "$LiOH \cdot H_2O$" and insert --$LiOH \bullet H_2O$-- therefor.

Column 9
Line 36; delete "$HOSO_2(CF_2)_4SO_2OH \cdot 4H_2O$"
and insert --$HOSO_2(CF_2)_4SO_2OH \bullet 4H_2O$-- therefor.

Line 40; delete "$C_1$-B*is*-Imide Acid"
and insert --$C_4$-B*is*-Imide Acid-- therefor.

Line 40; delete "$C_1$-B*is*-Imide Acid"
and insert --$C_4$-B*is*-Imide Acid-- therefor.

Line 64; delete "$LiOH \cdot H_2O$" and insert --$LiOH \bullet H_2O$-- therefor.

UNITED STATES PATENT AND TRADEMARK OFFICE
CERTIFICATE OF CORRECTION

PATENT NO. : 7,517,604 B2
APPLICATION NO. : 11/230090
DATED : April 14, 2009
INVENTOR(S) : Steven J. Hamrock It is certified that error appears in the above-identified patent and that said Letters Patent is hereby corrected as shown below:

Column 10
Line 18 and 19; delete "$C_4F_9SO_2NIISO_2(CF_2)_4SO_2 NIISO_2C_4F_9 \cdot 4H_2O$"
 and insert --$C_4F_9SO_2NHSO_2(CF_2)_4SO_2 NHSO_2C_4F_9 \bullet 4H_2O$-- therefor.

Line 35 and 36; delete "$C_4F_9SO_2N(H)SO_2(CF_2)_4SO_2N(H)SO_2C_4F_9 \cdot 4H_2O$"
 and insert --$C_4F_9SO_2N(H)SO_2(CF_2)_4SO_2N(H)SO_2C_4F_9 \bullet 4H_2O$-- therefor.

Line 40; delete "$\underline{C_4\text{-B}\mathit{is}\text{-Imide Acid}}$"
 and insert --$\underline{C_1\text{-B}\mathit{is}\text{-Imide Acid}}$-- therefor.

Line 41; delete "$C_4$-B*is*-Imide Acid"
 and insert --$C_1$-B*is*-Imide Acid-- therefor.

Line 43; delete "$C_1$-B*is*-Imide Acid"
 and insert --$C_4$-B*is*-Imide Acid-- therefor.

Signed and Sealed this

Tenth Day of November, 2009

David J. Kappos
*Director of the United States Patent and Trademark Office*